(12) United States Patent
Tsang et al.

(10) Patent No.: US 12,247,471 B2
(45) Date of Patent: Mar. 11, 2025

(54) SMALL MODULAR NUCLEAR REACTOR INTEGRATED ENERGY SYSTEMS FOR INDUSTRIAL APPLICATIONS, SUCH AS ENHANCED OIL RECOVERY OPERATIONS

(71) Applicant: NuScale Power, LLC, Portland, OR (US)

(72) Inventors: Francis Tsang, Bellingham, WA (US); José N. Reyes, Jr., Corvallis, OR (US)

(73) Assignee: NuScale Power, LLC, Corvallis, OR (US)

( * ) Notice: Subject to any disclaimer, the term of this patent is extended or adjusted under 35 U.S.C. 154(b) by 17 days.

(21) Appl. No.: 18/104,766

(22) Filed: Feb. 1, 2023

(65) Prior Publication Data
US 2023/0279756 A1 Sep. 7, 2023

Related U.S. Application Data

(60) Provisional application No. 63/316,955, filed on Mar. 4, 2022.

(51) Int. Cl.
*E21B 43/24* (2006.01)
*G21D 9/00* (2006.01)
(Continued)

(52) U.S. Cl.
CPC ........... *E21B 43/2403* (2013.01); *G21D 9/00* (2013.01); *G21C 1/322* (2013.01); *G21C 15/257* (2013.01); *Y02E 30/00* (2013.01)

(58) Field of Classification Search
CPC .................................................. E21B 43/2403
See application file for complete search history.

(56) References Cited

U.S. PATENT DOCUMENTS

2006/0013761 A1   1/2006   Lahoda
2007/0181301 A1*  8/2007   O'Brien .............. E21B 43/2635
                                                166/266
(Continued)

FOREIGN PATENT DOCUMENTS

WO   WO2023/167768 A2   9/2023
WO   WO2024/063805 A2   3/2024

OTHER PUBLICATIONS

ISA, International Search Report and Written Opinion mailed Jul. 31, 2023 in International Patent Application No. PCT/US23/12156, 16 pages.
(Continued)

*Primary Examiner* — Jonathan R Matthias
(74) *Attorney, Agent, or Firm* — Lee & Hayes, P.C.

(57) ABSTRACT

Integrated energy systems, such as for use in enhanced oil recovery operations, and associated devices and methods are described herein. A representative integrated energy system can include a power plant system having multiple modular nuclear reactors. The nuclear reactors can generate steam for direct industrial use or for use in an electrical power conversion system to generate electricity. Individual ones of the nuclear reactors can be configured to generate steam or electricity based on the requirements of different stages of the oil recovery operation. For example, during a first stage, a subset of the nuclear reactors can be configured to generate steam for the oil recovery operation for injection into an oil reservoir. During a second stage, some or all of the nuclear reactors in the subset can be reconfigured to generate electricity that can be routed to an industrial process different than the oil recovery operation.

15 Claims, 8 Drawing Sheets

(51) Int. Cl.
  *G21C 1/32*      (2006.01)
  *G21C 15/257*    (2006.01)

(56)           References Cited

U.S. PATENT DOCUMENTS

| 2010/0258309 | A1* | 10/2010 | Ayodele ............ E21B 43/243 |
|---|---|---|---|
|              |     |         | 166/272.3 |
| 2011/0068575 | A1  | 3/2011  | Zabtcioglu |
| 2011/0100006 | A1  | 5/2011  | No et al. |
| 2011/0198085 | A1  | 8/2011  | O'Brien |
| 2011/0200158 | A1  | 8/2011  | Hyde et al. |
| 2014/0015098 | A1  | 1/2014  | McIntyre |
| 2017/0152605 | A1  | 6/2017  | Izgorodin |
| 2017/0213610 | A1  | 7/2017  | Sumita |
| 2020/0135345 | A1  | 4/2020  | Kutsch |
| 2021/0110940 | A1  | 4/2021  | Botha et al. |
| 2023/0287583 | A1  | 9/2023  | Tsang |

OTHER PUBLICATIONS

Fujiwara, et al., "Hydrogen production by high temperature electrolysis with nuclear reactor" Progress in Nuclear Energy 50.2-6 (2008). Retrieved on Mar. 11, 2024 from <https://www.researchgate.net/profile/Takashi-Ogawa3/publication/236482800_Hydrogen_Production_by_High_Temperature_Electrolysis_with_Nuclear_Reactor/links/54ead96f0cf27a6dell4e7a5/Hydrogen_Production_by_High_Temperature_Electrolysis_with_Nuclear_Reactor.pdf> entire document.

PCT International Preliminary Report on Patentability mailed Sep. 19, 2024 for PCT Application No. PCT/US2023/014404, 12 pages.

PCT International Search Report and Written Opinion mailed Apr. 17, 2024 for PCT/US2023/014404; 16 pages.

Office Action for Canadian Application No. 3,244,256, dated Oct. 1, 2024, 6 pages.

Office Action for Canadian Application No. 3,244,780, dated Oct. 1, 2024, 4 pages.

* cited by examiner

SMALL MODULAR NUCLEAR REACTOR INTEGRATED ENERGY SYSTEMS FOR INDUSTRIAL APPLICATIONS, SUCH AS ENHANCED OIL RECOVERY OPERATIONS

CROSS-REFERENCE TO RELATED APPLICATION

This application claims the benefit of U.S. Provisional Patent Application No. 63/316,955, filed Mar. 4, 2022, and titled "SMR INTEGRATED ENERGY SYSTEMS FOR INDUSTRIAL APPLICATIONS," which is incorporated herein by reference in its entirety.

TECHNICAL FIELD

The present technology is directed to Small Modular nuclear Reactor (SMR) Integrated Energy Systems (IES) for industrial applications, and associated devices and methods.

BACKGROUND

Many processes in the petroleum, chemical, pharmaceutical, and material manufacturing industries require a combination of electrical power, steam, heat, hydrogen, oxygen, methanol, and/or urea to operate, for example, to produce industrial products. For example, steam-assisted-gravity-drain (SAGD) operations involve a pair of horizontal wellbores drilled into an oil or bitumen reservoir, one a few meters above the other. High-pressure steam is injected into the upper wellbore to heat oil in the reservoir to reduce its viscosity. The reduced viscosity oil then drains into the lower wellbore, where it is pumped out. SAGD can be used to recover heavy oil deposits that are too deep for surface mining and/or that require a reduction in oil viscosity to transport the oil to the surface.

Most SAGD operations require a cyclic steam generation and injection process. Typically, large quantities of superheated steam (~850° C.) are generated using fossil fuels with significant carbon dioxide emissions. For example, natural gas can be burned to produce steam, and the steam can then be transported under pressure for injection into the upper wellbore. However, clean energy mandates require that such processes limit emissions of carbon dioxide and oxides of nitrogen and sulfur into the environment.

BRIEF DESCRIPTION OF THE DRAWINGS

Many aspects of the present technology can be better understood with reference to the following drawings. The components in the drawings are not necessarily to scale. Instead, emphasis is placed on clearly illustrating the principles of the present technology.

DETAILED DESCRIPTION

Aspects of the present technology are directed generally toward integrated energy systems, such as for use in enhanced oil recovery operations (e.g., a steam-assisted-gravity-drain (SAGD) operations), and associated devices and methods. In some embodiments, an integrated energy system includes a power plant system having multiple Small Modular nuclear Reactors (SMRs) specifically configured to operate in unison to support one or more industrial operations (e.g., traditional industrial operations). SMRs are nuclear reactors that are smaller in terms of size (e.g., dimensions) and power compared to large, conventional nuclear reactors. Moreover, they are modular in that some or all of their systems and components can be factory-assembled and transported as a unit to a location for installation. In some aspects of the present technology, the multiple SMRs of the integrated energy system can flexibly provide electricity, steam, or a combination of both electricity and steam to the industrial operations due to the modularity and flexibility of the SMRs.

Each of the nuclear reactors can generate steam that can be routed (i) to the enhanced oil recovery operation and/or to another industrial process or (ii) to an electrical power conversion system to generate electricity. Individual ones of the nuclear reactors can be modularly controlled to generate steam and/or electricity based on the electricity and steam requirements of different stages of the enhanced oil recovery operation. For example, the enhanced oil recovery operation can comprise a first injection stage in which steam is injected into an oil reservoir through a first wellbore, a second soak stage in which the first wellbore is closed to allow the steam to lower the viscosity of the oil in the oil reservoir, and a third recovery stage in which the oil is removed from the oil reservoir through a second wellbore.

During the first injection stage, a first subset of the nuclear reactors can be configured to provide steam for injection into the first wellbore, while a second subset of the nuclear reactors can be configured to generate electricity for use in the first injection stage (e.g., for operating an auxiliary steam heater, a steam injector, etc.) and/or for other uses. Then, during the second soak stage during which steam is no longer required, the first subset of the nuclear reactors can be reconfigured to provide steam to another industrial process (e.g., a hydrogen production plant) and/or to generate electricity for use in the industrial process or for routing to a power grid. Similarly, during the third recovery stage, the first subset of the nuclear reactors can be configured to provide electricity for use in recovering (e.g., pumping out) the oil from the second wellbore, to provide steam to the industrial process, and/or to generate electricity for use in the industrial process or for routing to a power grid.

Certain details are set forth in the following description and in FIGS. 1-6 to provide a thorough understanding of various embodiments of the present technology. In other instances, well-known structures, materials, operations, and/or systems often associated with enhanced oil recovery operations, SAGD operations, nuclear reactors, power plant systems, integrated energy systems, and the like, are not shown or described in detail in the following disclosure to avoid unnecessarily obscuring the description of the various embodiments of the technology. Those of ordinary skill in the art will recognize, however, that the present technology can be practiced without one or more of the details set forth herein, and/or with other structures, methods, components, and so forth. The terminology used below is to be interpreted in its broadest reasonable manner, even though it is being used in conjunction with a detailed description of certain examples of embodiments of the technology.

The accompanying Figures depict embodiments of the present technology and are not intended to limit its scope unless expressly indicated. The sizes of various depicted elements are not necessarily drawn to scale, and these various elements may be enlarged to improve legibility. Component details may be abstracted in the Figures to exclude details such as position of components and certain precise connections between such components when such details are unnecessary for a complete understanding of how to make and use the present technology. Many of the details, dimensions, angles and other features shown in the Figures are merely illustrative of particular embodiments of the disclosure. Accordingly, other embodiments can have other details, dimensions, angles and features without departing from the present technology. In addition, those of ordinary skill in the art will appreciate that further embodiments of the present technology can be practiced without several of the details described below.

To the extent any materials incorporated herein by reference conflict with the present disclosure, the present disclosure controls. The headings provided herein are for convenience only and should not be construed as limiting the subject matter disclosed.

I. Select Embodiments of Nuclear Reactor Power Conversion Systems

Figure 1:
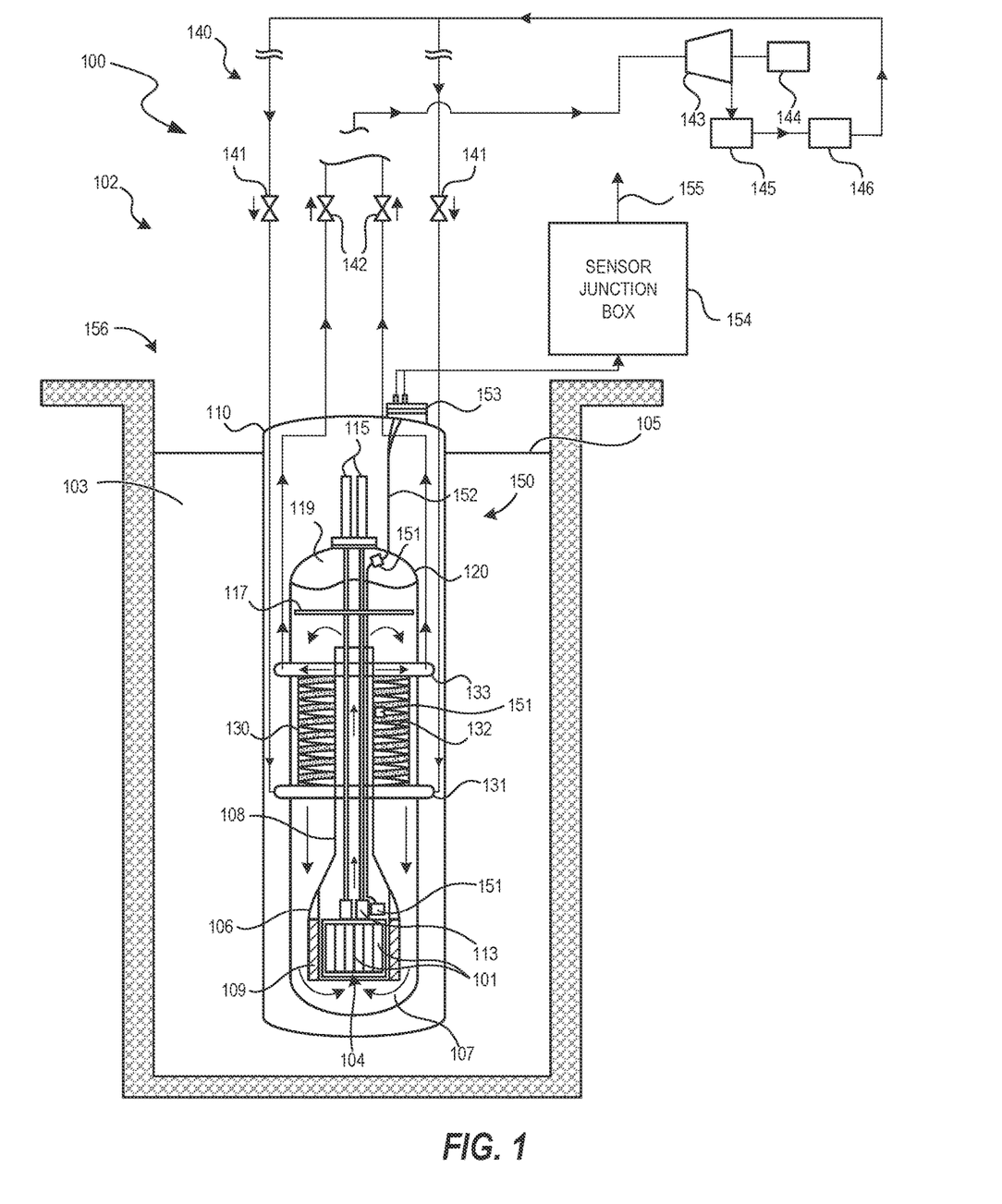
FIG. 1 is a partially schematic, partially cross-sectional view of a Small Modular Reactor system configured in accordance with embodiments of the present technology.
Figure 2:
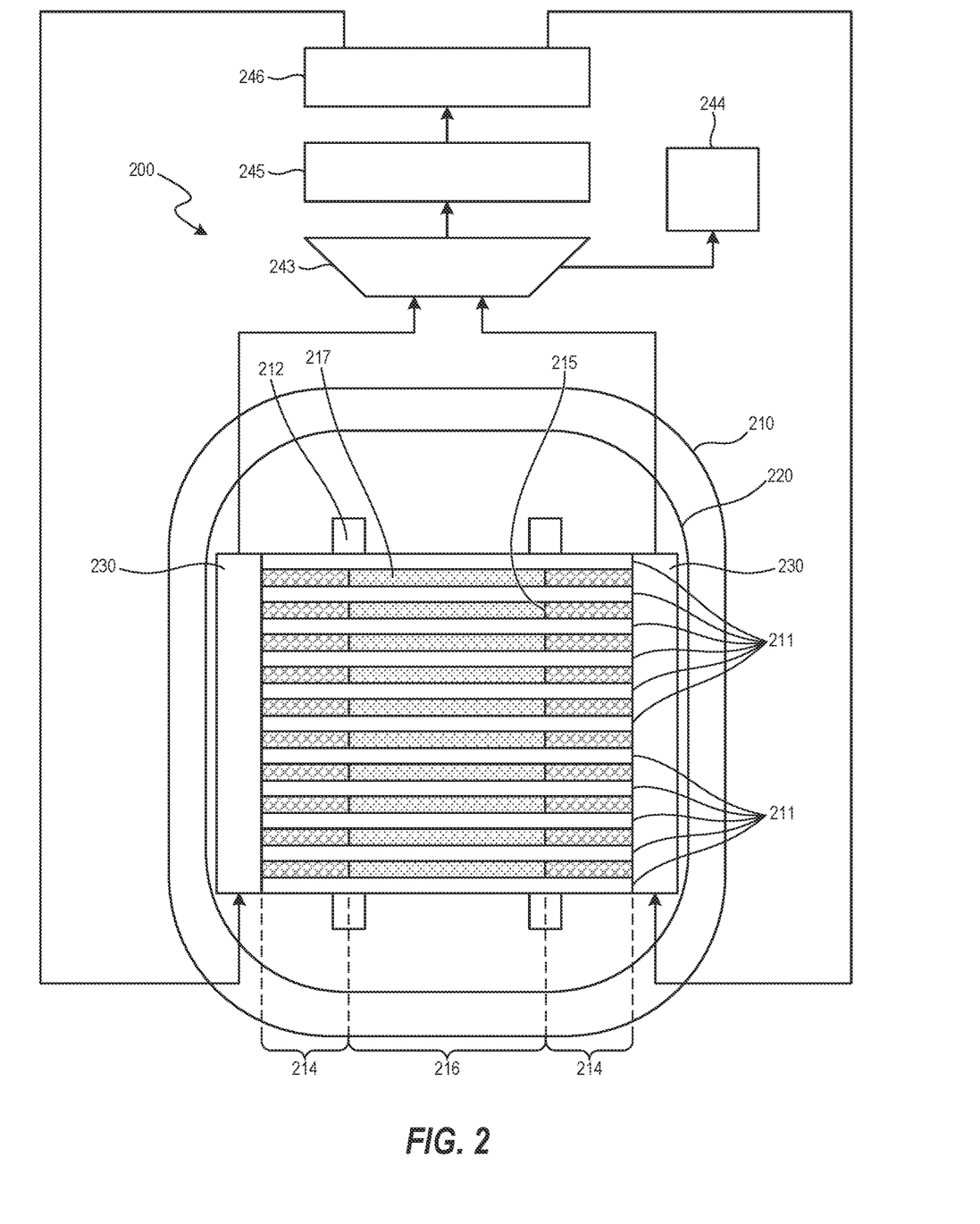
FIG. 2 is a partially schematic, partially cross-sectional view of a Small Modular Reactor system configured in accordance with additional embodiments of the present technology.

FIGS. 1 and 2 illustrate representative nuclear reactors that may be included in embodiments of the present technology. FIG. 1 is a partially schematic, partially cross-sectional view of a nuclear reactor system 100 configured in accordance with embodiments of the present technology. The system 100 can include a power module 102 having a reactor core 104 in which a controlled nuclear reaction takes place. Accordingly, the reactor core 104 can include one or more fuel assemblies 101. The fuel assemblies 101 can include fissile and/or other suitable materials. Heat from the reaction generates steam at a steam generator 130, which directs the steam to a power conversion system 140. The power conversion system 140 generates electrical power, and/or provides other useful outputs, such as super-heated steam. A sensor system 150 is used to monitor the operation of the power module 102 and/or other system components. The data obtained from the sensor system 150 can be used in real time to control the power module 102, and/or can be used to update the design of the power module 102 and/or other system components.

The power module 102 includes a containment vessel 110 (e.g., a radiation shield vessel, or a radiation shield container) that houses/encloses a reactor vessel 120 (e.g., a reactor pressure vessel, or a reactor pressure container), which in turn houses the reactor core 104. The containment vessel 110 can be housed in a power module bay 156. The power module bay 156 can contain a cooling pool 103 filled with water and/or another suitable cooling liquid. The bulk of the power module 102 can be positioned below a surface 105 of the cooling pool 103. Accordingly, the cooling pool 103 can operate as a thermal sink, for example, in the event of a system malfunction.

A volume between the reactor vessel 120 and the containment vessel 110 can be partially or completely evacuated to reduce heat transfer from the reactor vessel 120 to the surrounding environment (e.g., to the cooling pool 103). However, in other embodiments the volume between the reactor vessel 120 and the containment vessel 110 can be at least partially filled with a gas and/or a liquid that increases heat transfer between the reactor vessel 120 and the containment vessel 110. For example, the volume between the reactor vessel 120 and the containment vessel 110 can be at least partially filled (e.g., flooded with the primary coolant 107) during an emergency operation.

Within the reactor vessel 120, a primary coolant 107 conveys heat from the reactor core 104 to the steam generator 130. For example, as illustrated by arrows located within the reactor vessel 120, the primary coolant 107 is heated at the reactor core 104 toward the bottom of the reactor vessel 120. The heated primary coolant 107 (e.g., water with or without additives) rises from the reactor core 104 through a core shroud 106 and to a riser tube 108. The hot, buoyant primary coolant 107 continues to rise through the riser tube 108, then exits the riser tube 108 and passes downwardly through the steam generator 130. The steam generator 130 includes a multitude of conduits 132 that are arranged circumferentially around the riser tube 108, for example, in a helical pattern, as is shown schematically in FIG. 1. The descending primary coolant 107 transfers heat to a secondary coolant (e.g., water) within the conduits 132, and descends to the bottom of the reactor vessel 120 where the cycle begins again. The cycle can be driven by the changes in the buoyancy of the primary coolant 107, thus reducing or eliminating the need for pumps to move the primary coolant 107.

The steam generator 130 can include a feedwater header 131 at which the incoming secondary coolant enters the steam generator conduits 132. The secondary coolant rises through the conduits 132, converts to vapor (e.g., steam), and is collected at a steam header 133. The steam exits the steam header 133 and is directed to the power conversion system 140.

The power conversion system 140 can include one or more steam valves 142 that regulate the passage of high pressure, high temperature steam from the steam generator 130 to a steam turbine 143. The steam turbine 143 converts the thermal energy of the steam to electricity via a generator 144. The low-pressure steam exiting the turbine 143 is condensed at a condenser 145, and then directed (e.g., via a pump 146) to one or more feedwater valves 141. The feedwater valves 141 control the rate at which the feedwater re-enters the steam generator 130 via the feedwater header 131. In other embodiments, the steam from the steam generator 130 can be routed for direct use in an industrial process, such as an enhanced oil recovery operation described in detail below. Accordingly, steam exiting the steam generator 130 can bypass the power conversion system 140.

The power module 102 includes multiple control systems and associated sensors. For example, the power module 102 can include a hollow cylindrical reflector 109 that directs neutrons back into the reactor core 104 to further the nuclear reaction taking place therein. Control rods 113 are used to modulate the nuclear reaction, and are driven via fuel rod drivers 115. The pressure within the reactor vessel 120 can be controlled via a pressurizer plate 117 (which can also serve to direct the primary coolant 107 downwardly through the steam generator 130) by controlling the pressure in a pressurizing volume 119 positioned above the pressurizer plate 117.

The sensor system 150 can include one or more sensors 151 positioned at a variety of locations within the power module 102 and/or elsewhere, for example, to identify operating parameter values and/or changes in parameter values. The data collected by the sensor system 150 can then be used to control the operation of the system 100, and/or to generate design changes for the system 100. For sensors positioned within the containment vessel 110, a sensor link 152 directs data from the sensors to a flange 153 (at which the sensor link 152 exits the containment vessel 110) and directs data to a sensor junction box 154. From there, the sensor data can be routed to one or more controllers and/or other data systems via a data bus 155.

FIG. 2 is a partially schematic, partially cross-sectional view of a nuclear reactor system 200 ("system 200") configured in accordance with additional embodiments of the present technology. In some embodiments, the system 200 can include some features that are at least generally similar in structure and function, or identical in structure and function, to the corresponding features of the system 100 described in detail above with reference to FIG. 1, and can operate in a generally similar or identical manner to the system 100.

In the illustrated embodiment, the system 200 includes a reactor vessel 220 and a containment vessel 210 surrounding/enclosing the reactor vessel 220. In some embodiments, the reactor vessel 220 and the containment vessel 210 can be roughly cylinder-shaped or capsule-shaped. The system 200 further includes a plurality of heat pipe layers 211 within the reactor vessel 220. In the illustrated embodiment, the heat pipe layers 211 are spaced apart from and stacked over one another. In some embodiments, the heat pipe layers 211 can be mounted/secured to a common frame 212, a portion of the reactor vessel 220 (e.g., a wall thereof), and/or other suitable structures within the reactor vessel 220. In other embodiments, the heat pipe layers 211 can be directly stacked on top of one another such that each of the heat pipe layers 211 supports and/or is supported by one or more of the other ones of the heat pipe layers 211.

In the illustrated embodiment, the system 200 further includes a shield or reflector region 214 at least partially surrounding a core region 216. The heat pipes layers 211 can be circular, rectilinear, polygonal, and/or can have other shapes, such that the core region 216 has a corresponding three-dimensional shape (e.g., cylindrical, spherical). In some embodiments, the core region 216 is separated from the reflector region 214 by a core barrier 215, such as a metal wall. The core region 216 can include one or more fuel sources, such as fissile material, for heating the heat pipes layers 211. The reflector region 214 can include one or more materials configured to contain/reflect products generated by burning the fuel in the core region 216 during operation of the system 200. For example, the reflector region 214 can include a liquid or solid material configured to reflect neutrons and/or other fission products radially inward toward the core region 216. In some embodiments, the reflector region 214 can entirely surround the core region 216. In other embodiments, the reflector region 214 may partially surround the core region 216. In some embodiments, the core region 216 can include a control material 217, such as a moderator and/or coolant. The control material 217 can at least partially surround the heat pipe layers 211 in the core region 216 and can transfer heat therebetween.

In the illustrated embodiment, the system 200 further includes at least one heat exchanger 230 (e.g., a steam generator) positioned around the heat pipe layers 211. The heat pipe layers 211 can extend from the core region 216 and at least partially into the reflector region 214, and are thermally coupled to the heat exchanger 230. In some embodiments, the heat exchanger 230 can be positioned outside of or partially within the reflector region 214. The heat pipe layers 211 provide a heat transfer path from the core region 216 to the heat exchanger 230. For example, the heat pipe layers 211 can each include an array of heat pipes that provide a heat transfer path from the core region 216 to the heat exchanger 230. When the system 200 operates, the fuel in the core region 216 can heat and vaporize a fluid within the heat pipes in the heat pipe layers 211, and the fluid can carry the heat to the heat exchanger 230. The heat pipes in the heat pipe layers 211 can then return the fluid toward the core region 216 via wicking, gravity, and/or other means to be heated and vaporized once again.

In some embodiments, the heat exchanger 230 can be similar to the steam generator 130 of FIG. 1 and, for example, can include one or more helically-coiled tubes that wrap around the heat pipe layers 211. The tubes of the heat exchanger 230 can include or carry a working fluid (e.g., a coolant such as water or another fluid) that carries the heat from the heat pipe layers 211 out of the reactor vessel 220 and the containment vessel 210 for use in generating electricity, steam, and/or the like. For example, in the illustrated embodiment the heat exchanger 230 is operably coupled to a turbine 243, a generator 244, a condenser 245, and a pump 246. As the working fluid within the heat exchanger 230 increases in temperature, the working fluid may begin to boil and vaporize. The vaporized working fluid (e.g., steam) may be used to drive the turbine 243 to convert the thermal potential energy of the working fluid into electrical energy via the generator 244. The condenser 245 can condense the working fluid after it passes through the turbine 243, and the pump 246 can direct the working fluid back to the heat exchanger 230 where it can begin another thermal cycle. In other embodiments, steam from the heat exchanger 230 can be routed for direct use in an industrial process, such as an enhanced oil recovery operation described in detail below. Accordingly, steam exiting the heat exchanger 230 can bypass the turbine 243, the generator 244, the condenser 245, the pump 246, etc.

Figure 3:
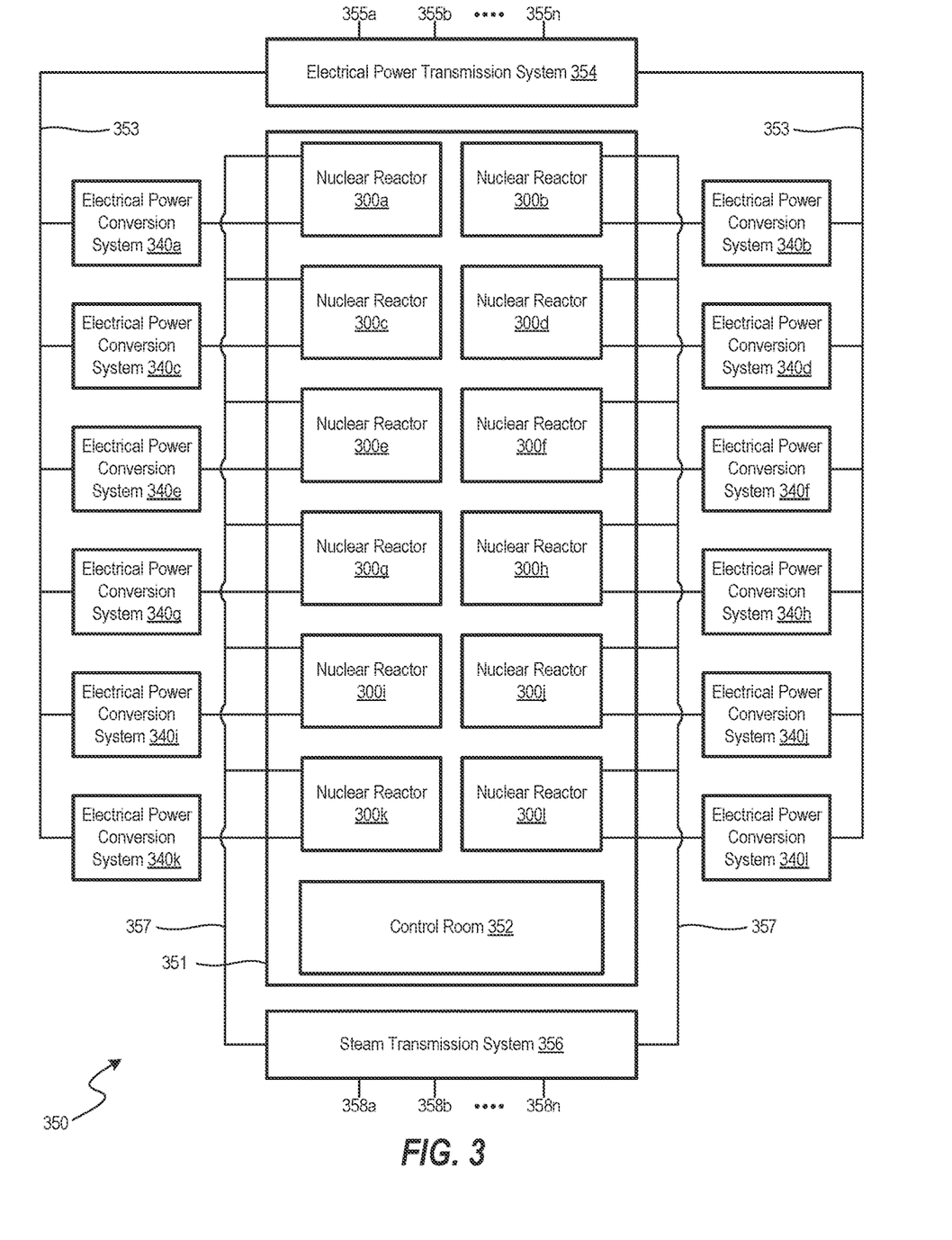
FIG. 3 is a schematic view of a nuclear power plant system including multiple Small Modular Reactor systems in accordance with embodiments of the present technology.

FIG. 3 is a schematic view of a nuclear power plant system 350 ("power plant system 350") including multiple nuclear reactors 300 (individually identified as first through twelfth nuclear reactors 300a-1, respectively) in accordance with embodiments of the present technology. Each of the nuclear reactors 300 can be similar to or identical to the nuclear reactor 100 and/or the nuclear reactor 200 described in detail above with reference to FIGS. 1 and 2. The power plant system 350 can be "modular" in that each of the nuclear reactors 300 can be operated separately to provide an output, such as electricity or steam. The power plant system 350 can include fewer than twelve of the nuclear reactors 300 (e.g., two, three, four, five, six, seven, eight, nine, ten, or eleven of the nuclear reactors 300), or more than twelve of the nuclear reactors 300. The power plant system 350 can be a permanent installation or can be mobile (e.g., mounted on a truck, tractor, mobile platform, and/or the like). In the illustrated embodiment, each of the nuclear reactors 300 can be positioned within a common housing 351, such as a reactor plant building, and controlled and/or monitored via a control room 352.

Each of the nuclear reactors 300 can be coupled to a corresponding electrical power conversion system 340 (individually identified as first through twelfth electrical power conversion systems 340a-1, respectively). The electrical power conversion systems 340 can include one or more devices that generate electrical power or some other form of usable power from steam generated by the nuclear reactors 300. For example, the electrical power conversion systems 340 can include features that are similar or identical to the power conversion system 140 described in detail above with reference to FIG. 1. In some embodiments, multiple ones of the nuclear reactors 300 can be coupled to the same one of the electrical power conversion systems 340 and/or one or more of the nuclear reactors 300 can be coupled to multiple ones of the electrical power conversion systems 340 such that there is not a one-to-one correspondence between the nuclear reactors 300 and the electrical power conversion systems 340.

The electrical power conversion systems 340 can be further coupled to an electrical power transmission system 354 via, for example, an electrical power bus 353. The electrical power transmission system 354 and/or the electrical power bus 353 can include one or more transmission lines, transformers, and/or the like for regulating the current, voltage, and/or other characteristic(s) of the electricity generated by the electrical power conversion systems 340. The electrical power transmission system 354 can route electricity via a plurality of electrical output paths 355 (individually identified as electrical output paths 355a-n) to one or more end users and/or end uses, such as different electrical loads of an integrated energy system as described in greater detail below with reference to FIGS. 4-6.

Each of the nuclear reactors 300 can further be coupled to a steam transmission system 356 via, for example, a steam bus 357. The steam bus 357 can route steam generated from the nuclear reactors 300 to the steam transmission system 356 which in turn can route the steam via a plurality of steam output paths 358 (individually identified as steam output paths 358a-n) to one or more end users and/or end uses, such as different steam inputs of an integrated energy system as described in greater detail below with reference to FIGS. 4-6.

In some embodiments, the nuclear reactors 300 can be individually controlled (e.g., via the control room 352) to provide steam to the steam transmission system 356 and/or steam to the corresponding one of the electrical power conversion systems 340 to provide electricity to the electrical power transmission system 354. In some embodiments, the nuclear reactors 300 are configured to provide steam either to the steam bus 357 or to the corresponding one of the electrical power conversion systems 340, and can be rapidly and efficiently switched between providing steam to either. Accordingly, in some aspects of the present technology the nuclear reactors 300 can be modularly and flexibly controlled such that the power plant system 350 can provide differing levels/amounts of electricity via the electrical power transmission system 354 and/or steam via the steam transmission system 356. For example, where the power plant system 350 is used to provide electricity and steam to an industrial process, such as an enhanced oil recovery operation, the nuclear reactors 300 can be controlled to meet the differing electricity and steam requirements of the industrial process.

As one example, during a first stage of an industrial process, a first subset of the nuclear reactors 300 (e.g., the first through sixth nuclear reactors 300a-f) can be configured to provide steam to the steam transmission system 356 for use in the first stage of the industrial process, while a second subset of the nuclear reactors 300 (e.g., the seventh through twelfth nuclear reactors 300g-l) can be configured to provide steam to the corresponding ones of the electrical power conversion systems 340 (e.g., the seventh through twelfth electrical power conversion systems 340g-l) to generate electricity for the first stage of industrial process. Then, during a second stage of the industrial process when steam is no longer required, the first subset of the nuclear reactors 300 can be switched to provide steam to the corresponding ones of the electrical power conversion systems 340 (e.g., the seventh through twelfth electrical power conversion systems 340g-l) such that all of the nuclear reactors 300 within the power plant system 350 are configured to generate electricity. Other variations of steam and electricity generation are possible based on the needs of the industrial process.

In contrast, some conventional nuclear power plant systems can typically generate either steam or electricity for output, and cannot be modularly controlled to provide varying levels of steam and electricity for output. Moreover, it is typically difficult (e.g., expensive, time consuming, etc.) to switch between steam generation and electricity generation in conventional nuclear power plant systems. Specifically, for example, it is typically extremely time consuming to switch between steam generation and electricity generation in prototypical large nuclear power plant systems.

The nuclear reactors 300 can be individually controlled via one or more operators and/or via a computer system. Accordingly, many embodiments of the technology described herein may take the form of computer- or machine- or controller-executable instructions, including routines executed by a programmable computer or controller. Those skilled in the relevant art will appreciate that the technology can be practiced on computer/controller systems other than those shown and described herein. The technology can be embodied in a special-purpose computer, controller or data processor that is specifically programmed, configured or constructed to perform one or more of the computer-executable instructions described below. Accordingly, the terms "computer" and "controller" as generally used herein refer to any data processor and can include Internet appliances and hand-held devices (including palmtop computers, wearable computers, cellular or mobile phones, multi-processor systems, processor-based or programmable consumer electronics, network computers, mini computers and the like). Information handled by these computers can be presented at any suitable display medium, including a liquid crystal display (LCD).

The technology can also be practiced in distributed environments, where tasks or modules are performed by remote processing devices that are linked through a communications network. In a distributed computing environment, program modules or subroutines may be located in local and remote memory storage devices. Aspects of the technology described herein may be stored or distributed on computer-readable media, including magnetic or optically readable or removable computer disks, as well as distributed electronically over networks. Data structures and transmissions of data particular to aspects of the technology are also encompassed within the scope of the embodiments of the technology.

II. Select Embodiments of Integrated Energy Systems

Figure 4:
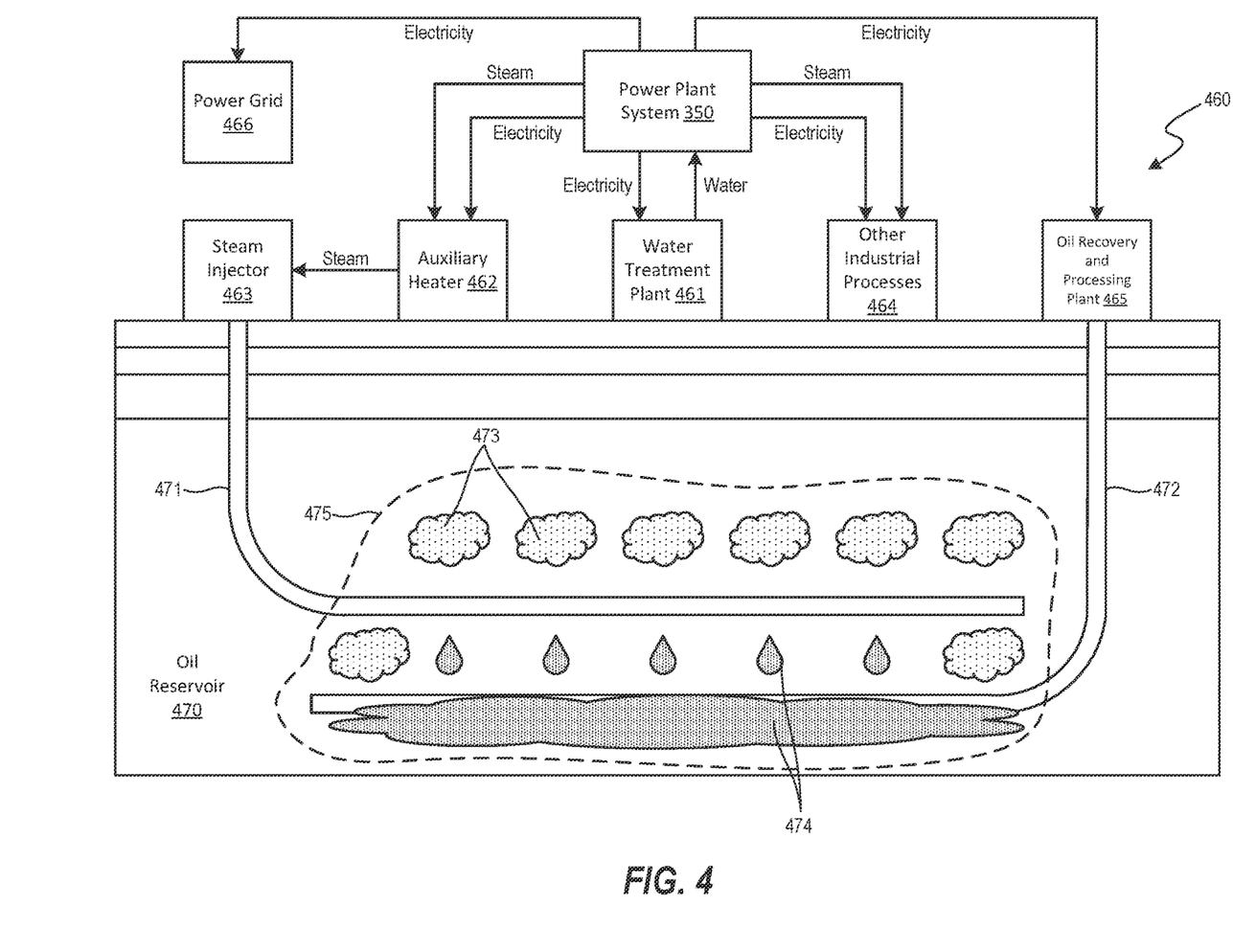
FIG. 4 is a schematic diagram of an Integrated Energy System including the power plant system of FIG. 3 in accordance with embodiments of the present technology.

FIG. 4 is a schematic diagram of an integrated energy system 460 including the power plant system 350 of FIG. 3 in accordance with embodiments of the present technology. In the illustrated embodiment, the power plant system 350 is configured for use in an industrial process/operation and, more particularly, for use in an enhanced oil recovery operation, such as a steam-assisted-gravity-drain (SAGD) operation. The power plant system 350 can be located at or near the location of an oil reservoir 470, such as an oil sand reservoir and/or bitumen reservoir. For example, the power plant system 350 can be a permanent or temporary installation built at or near the location of the oil reservoir 470, or can be a mobile or partially mobile system that is moved to and assembled at or near the location of the oil reservoir 470. More generally, the power plant system 350 can be local (e.g., positioned at or near) the industrial process.

In the illustrated embodiment, the power plant system 350 is operably coupled to a water production plant 461, an auxiliary heater 462, and an oil (e.g., bitumen) recovery and/or processing plant 465 for carrying out the enhanced oil recovery operation. The water production plant 461, the auxiliary heater 462, the oil recovery and processing plant 465, and/or additional components for carrying out the enhanced oil recovery operation can be referred to as a primary subsystem for carrying out the enhanced oil recovery operation. The power plant system 350 can also be operably coupled to one or more other industrial processes 464 (e.g., industrial processing plants) and a power grid 466. The one or more industrial processes 464, the power grid 466, and/or additional outputs unrelated to the enhanced oil recovery operation can be referred to as a secondary subsystem for carrying out a secondary process. More specifically, referring to FIGS. 3 and 4, individual ones of the electrical output paths 355 of the electrical power transmission system 354 can be electrically coupled to the water production plant 461, the auxiliary heater 462, the oil recovery and processing plant 465, the other industrial processes 464, and the power grid 466 for selectively providing electricity thereto. Similarly, individual ones of the steam output paths 358 of the steam transmission system 356 can be fluidly coupled to the auxiliary heater 462 and the other industrial processes 464 for selectively providing steam thereto. In other embodiments, the power plant system 350 can be operably coupled to additional or fewer outputs and/or the various outputs can receive electricity and/or steam from other sources (e.g., conventional steam generators, conventional electricity sources, etc.).

Referring to FIG. 4, the enhanced oil recovery operation (e.g., SAGD operation) involves a pair of wells (e.g., a steam injection well 471 and a bitumen or oil recovery well 472) that are drilled into the oil reservoir 470 and extend horizontally through the oil reservoir 470. The horizontal extent of the steam injection well 471 extends above the horizontal extent of the oil recovery well 472 (e.g., by a few meters). High-pressure steam 473 is injected into the steam injection well 471 to heat oil 474 (e.g., hydrocarbon chemicals, carbon fuel (crude oil), bitumen, and/or the like) in the oil reservoir 470 to reduce its viscosity. This causes the heated oil 474 to drain into the oil recovery well 472, where it is pumped out. Such an enhanced oil recovery operation can be used to recover heavy oil deposits that are too deep for surface mining and/or that require a reduction in oil viscosity to transport the oil to the surface.

Most enhanced oil recovery operations require a cyclic steam generation and injection process that includes multiple stages. For example, a first stage (e.g., first well state) can be an injection stage, during which a measured amount of steam 473 is introduced into the oil reservoir 470 via the steam injection well 471 to form a steam chamber 475 within the oil reservoir 470. A second stage (e.g., a second well state) can be a soak stage in which the steam injection well 471 and the oil recovery well 472 are shut in (e.g., closed) for a period of time (e.g., several days) to allow for uniform heat distribution within the steam chamber 475 to reduce the viscosity of the oil 474 (e.g., to raise the reservoir temperature above the pour point of the oil 474). Finally, a third stage (e.g., a third well state) can be a production stage in which the now-mobile oil 474 is recovered through the oil recovery well 472. The multiple stages can be cyclically repeated until the flow of the oil 474 diminishes below a target threshold. The entire enhanced oil recovery operation requires a flexible method of steam generation as steam is only utilized during the injection stage.

Figure 5A:
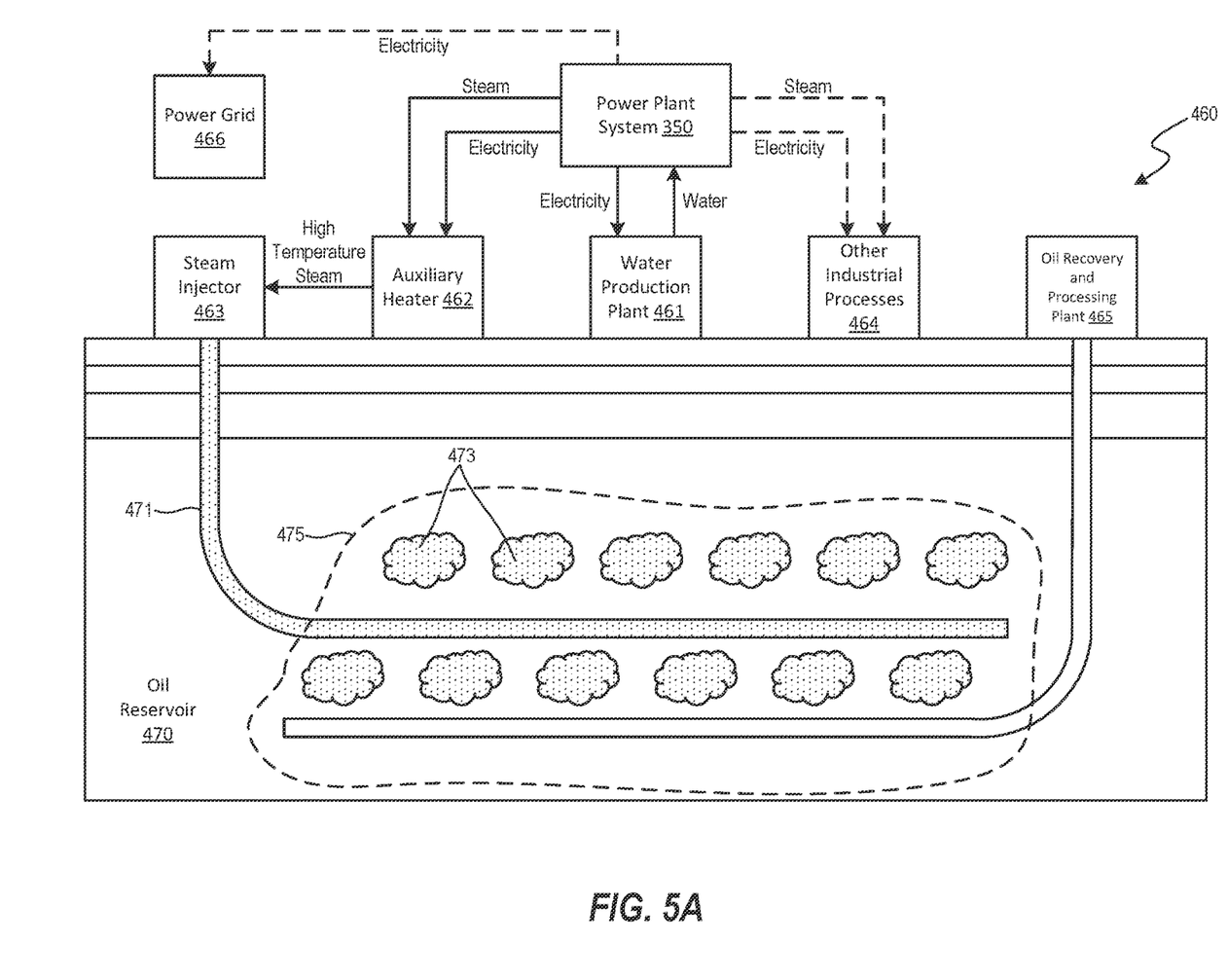
FIGS. 5A-5C are schematic diagrams of the Integrated Energy System of FIG. 4 during first through third stages, respectively, of an enhanced oil recovery operation in accordance with embodiments of the present technology.
Figure 5B:
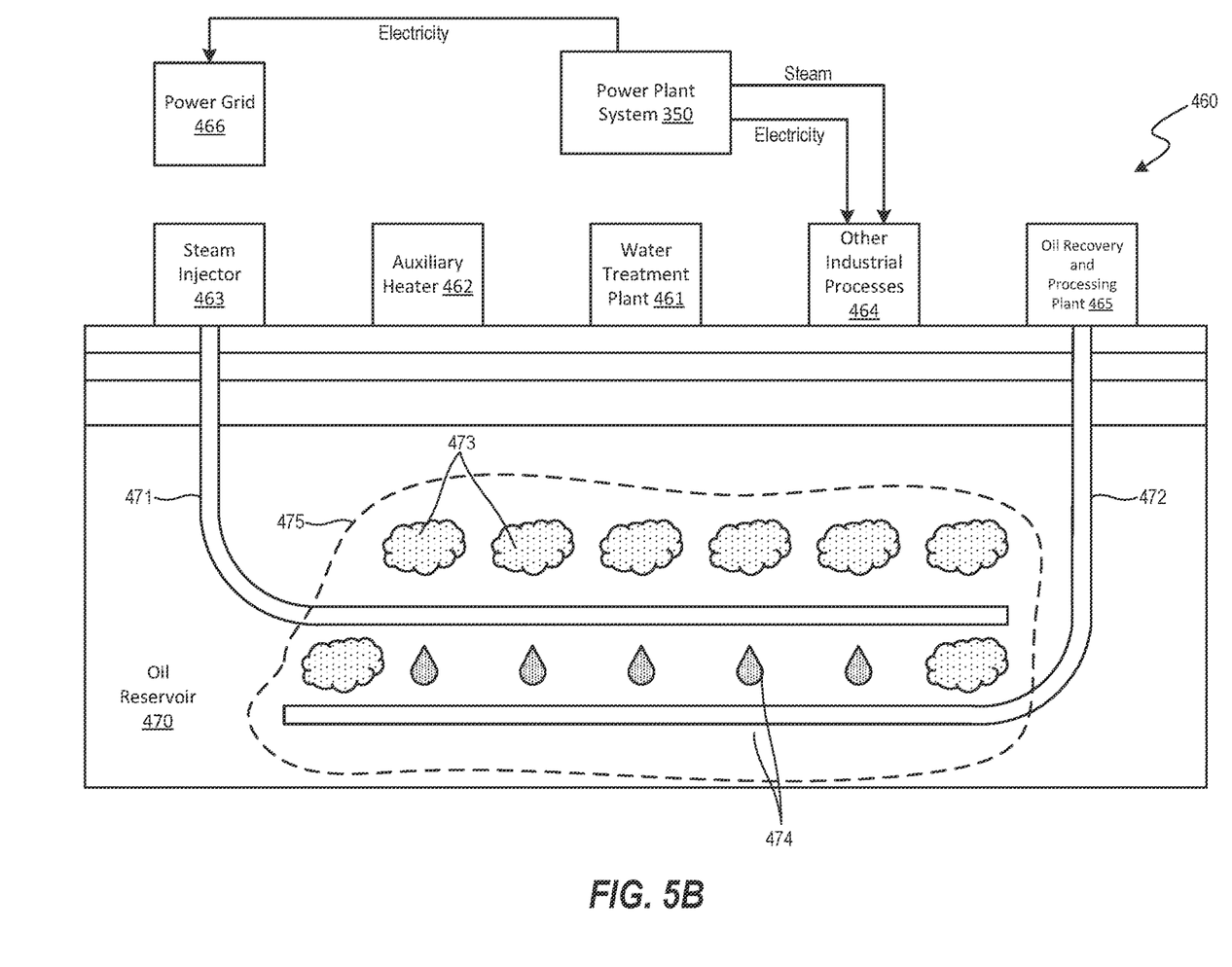
Figure 5C:
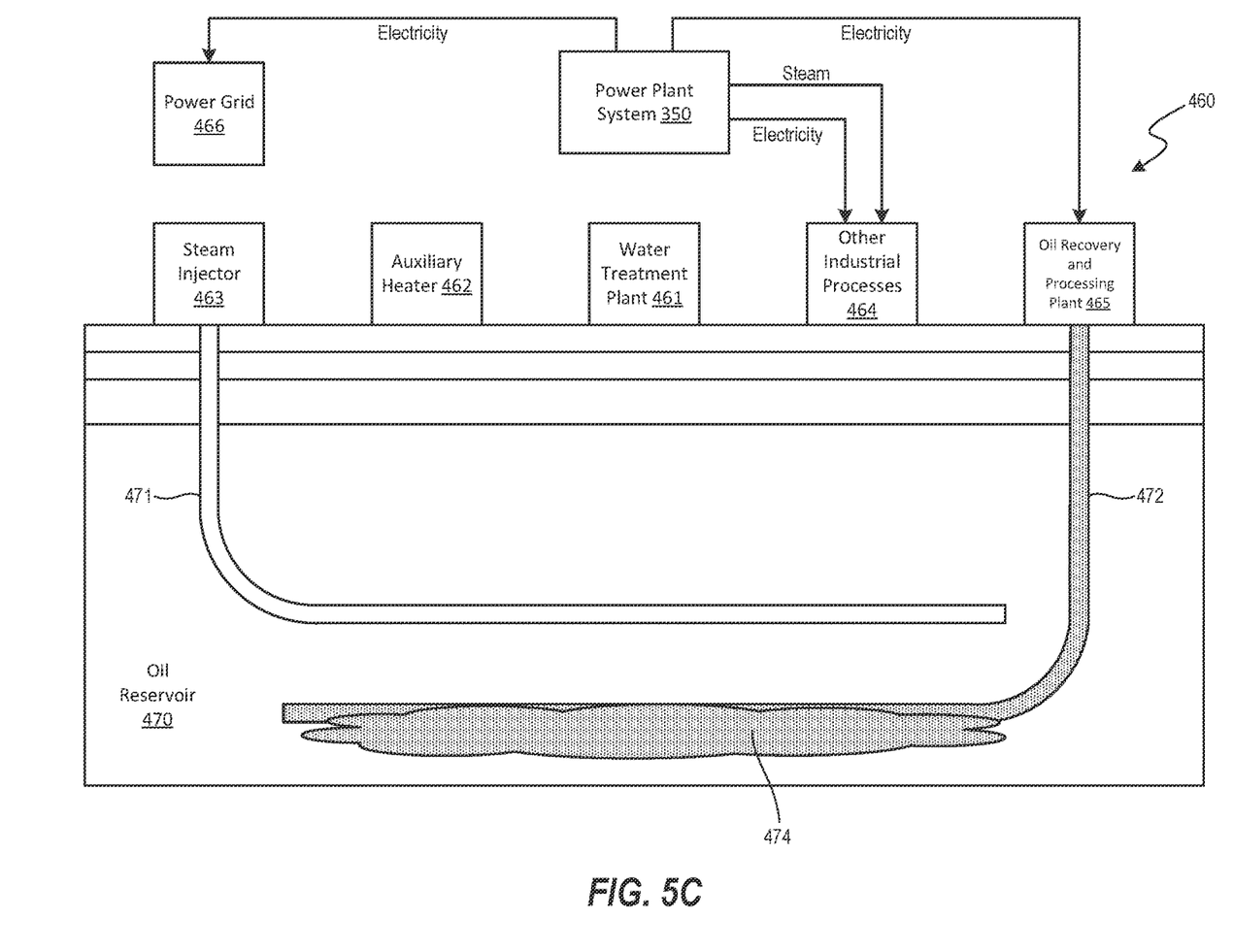

The power plant system 350 can be controlled to selectively provide electricity and steam to the various outputs based on the stage of the enhanced oil recovery operation. FIGS. 5A-5C, for example, are schematic diagrams of the integrated energy system 460 during the first through third stages of the enhanced oil recovery (e.g., SAGD) operation, respectively, in accordance with embodiments of the present technology. Referring to FIG. 5A, during the illustrated first injection stage, the power plant system 350 can be configured in a first operating state to provide electricity to the water production plant 461 (e.g., via one or more of the electrical output paths 355 from the electrical power transmission system 354 of FIG. 3). The water production plant 461 can be a water treatment plant, a desalination plant, and/or the like and is configured to produce high quality water. For example, the water production plant 461 can operate to demineralize and/or otherwise remove contaminants and/or unwanted material from a water source. The water production plant 461 can route the produced high-quality water to the power plant system 350, and the power plant system 350 can use the water to produce high quality steam. For example, the produced water can be used as a secondary coolant in a steam generator of one or more of the nuclear reactors 300. In some embodiments, the water production plant 461 can be omitted and the power plant system 350 can utilize water from other sources to generate steam.

Further when the power plant system 350 is in the first operating state during the first stage, the power plant system 350 is configured to generate electricity and steam and route the electricity and steam (e.g., via one or more of the steam output paths 358 of the steam transmission system 356 and via one or more of the electrical output paths 355 from the electrical power transmission system 354, respectively, of FIG. 3) to the auxiliary heater 462. The auxiliary heater 462 converts the electricity to heat to superheat the steam from the power plant system 350 (e.g., to above 600° C., to 850° C., or greater) and routes the superheated steam to the steam injector 463. The steam injector 463 injects the steam into the steam injection well 471 which routes the steam into the oil reservoir 470 to form the steam chamber 475. In some embodiments, the auxiliary heater 462 can be omitted if the steam generated by the power plant system 350 is sufficiently heated. In some aspects of the present technology, the steam generated by the power plant system 350 is directly routed to the steam injection well 471 (e.g., through the auxiliary heater 462) without much energy loss. In contrast, conventional enhanced oil recovery operations typically utilize electricity to run a steam generator to generate steam. Such conventional operations are less efficient than the present technology because energy is lost during the extra step of converting electricity to steam. That is, the present technology directly generates steam for well injection rather than, for example, generating steam for input to an electrical power conversion system that generates electricity that is then used to run a steam generator to generate steam.

Referring to FIGS. 3 and 5A together, in some aspects of the present technology, in the first operating state during the first stage of the enhanced oil recovery operation, a first subset of the nuclear reactors 300 can be configured to provide steam to the steam transmission system 356 for routing to the steam injection well 471 (e.g., via the auxiliary heater 462), while a second subset of the nuclear reactors 300 can be configured to provide steam to the corresponding ones of the electrical power conversion systems 340 to generate electricity for use by the water production plant 461 and the auxiliary heater 462. If the electricity and/or steam requirements of the first stage of the enhanced oil recovery operation are less than the electricity and/or steam production of the power plant system 350, the power plant system 350 can either shut down one or more of the nuclear reactors 300 or route excess electricity and/or steam to the other industrial processes 464, to the power grid 466, and/or to other end uses. For example, if the first subset of nuclear reactors 300 that generate steam for the enhanced oil recovery operation includes the first through fourth nuclear reactors 300a-d, and the second subset of the nuclear reactors 300 that generate electricity for the enhanced oil recovery operation includes the fifth through eighth nuclear reactors 300e-h, then a third subset of the nuclear reactors 300 including the ninth through twelfth nuclear reactors 300i-1 can be shut down or used to generate electricity and/or steam for uses other than in the enhanced oil recovery operation.

The other industrial processes 464 can include clean energy processes such as hydrogen and oxygen production, direct-air-carbon-capture (DACC) processes, and/or the like. For example, excess electricity and steam can be utilized in a hydrogen and oxygen production plant configured to carry out high-temperature steam electrolysis (HTSE) and/or low-temperature steam electrolysis (e.g., polymer electrolyte membrane (PEM)) processes to produce hydrogen and oxygen. The produced hydrogen and oxygen can be transported using pressurized containers and heated pipelines to industrial complexes and clean chemical plants. In other embodiments, the excess electricity and steam can be used to produce methanol, urea, and/or other industrial products. The power grid 466 can supply power to a plurality of remote end users, or can be a power grid dedicated to a specific consumer.

Referring to FIG. 5B, during the illustrated second soak stage, the power plant system 350 can be configured in a second operating state different than the first operating state to provide (i) electricity to the other industrial processes 464, (ii) steam to the other industrial processes 464, (iii) electricity to the power grid 466, and/or (iv) electricity and/or steam to other end uses. During the second soak stage, the steam 473 in the steam chamber 475 reduces the viscosity of the oil 474 such that the oil moves toward the oil recovery well 472. Referring to FIGS. 3 and 5B, in some aspects of the present technology some of the nuclear reactors 300 of the power plant system 350 can be reconfigured in the second operating state during the second stage from the first operating state during the first stage to provide electricity generation rather than steam output. For example, some or all of the nuclear reactors 300 that were in the first subset in the first operating state (e.g., configured to provide steam to the steam transmission system 356 for routing to the steam injection well 471) can be reconfigured in the second operating state to provide steam to the corresponding ones of the electrical power conversion systems 340 to generate electricity for routing to the other industrial processes 464 and/or to the power grid 466. That is, the modularity of the nuclear reactors 300 allows the power plant system 350 to flexibly/dynamically switch the output of electricity and steam from individual ones of the nuclear reactors 300 based on the state/stage of the enhanced oil recovery operation. Therefore, during the second soak stage, when no steam is being injected into the steam injection well 471, the nuclear reactors 300 that previously produced the steam for injection can be reconfigured to provide steam and/or electricity outputs to other end uses.

Referring to FIG. 5C, during the illustrated third soak stage, the power plant system 350 can be configured in a third operating state to provide (i) electricity to the oil recovery and processing plant 465, (ii) electricity to the other industrial processes 464, (iii) steam to the other industrial processes 464, (iv) electricity to the power grid 466, and/or (v) electricity and/or steam to other end uses. The oil recovery and processing plant 465 can include utilize the electricity to pump the pooled oil 474 through the oil recovery well 472 and, in some embodiments, to process the recovered oil (e.g., process recovered bitumen) into a more usable form. Referring to FIGS. 3 and 5C, in some aspects of the present technology some of the nuclear reactors 300 of the power plant system 350 can be reconfigured in the third operating state from the second operating state to provide electricity generation rather than steam output. For example, some or all of the nuclear reactors 300 providing steam to the other industrial processes 464 during the second stage can be reconfigured to supply electricity to the oil recovery and processing plant 465. Accordingly, the total amount of electricity and/or steam routed to the other industrial processes 464 and the power grid 466 can be less in the third state than in the second state as some of the nuclear reactors 300 are reconfigured to supply electricity to the oil recovery and processing plant 465. Again, the modularity of the nuclear reactors 300 allows the power plant system 350 to flexibly/dynamically switch the output of electricity and steam from individual ones of the nuclear reactors 300 based on the stage of the enhanced oil recovery operation.

Referring to FIGS. 3-5C, the power plant system 350 can be cyclically operated as the first, second, and third stages of the enhanced oil recovery operation are repeated. During each stage, some or all of the nuclear reactors 300 can be reconfigured between the different operating states to (i) provide the steam and electricity outputs required by the enhanced oil recovery operation and (ii) provide any excess steam and/or electricity to the other industrial processes 464, the power grid 466, and/or other end uses. In contrast, conventional (e.g., non-modular) power plant systems cannot flexibly and dynamically switch their output between steam and electricity generation—let alone between varying levels of steam and electricity generation. Accordingly, in conventional enhanced oil recovery operations, superheated steam is typically generated using fossil fuels with significant carbon emissions. In some aspects of the present technology, the power plant system 350 produces steam and electricity in a clean (e.g., carbon-free) manner that limits emissions of carbon dioxide and other oxides (e.g., nitrogen oxides, sulfur oxides) to the environment. Accordingly, the integrated energy system 460 can meet clean energy mandates that require that such enhanced oil recovery processes limit such emissions.

Figure 6:
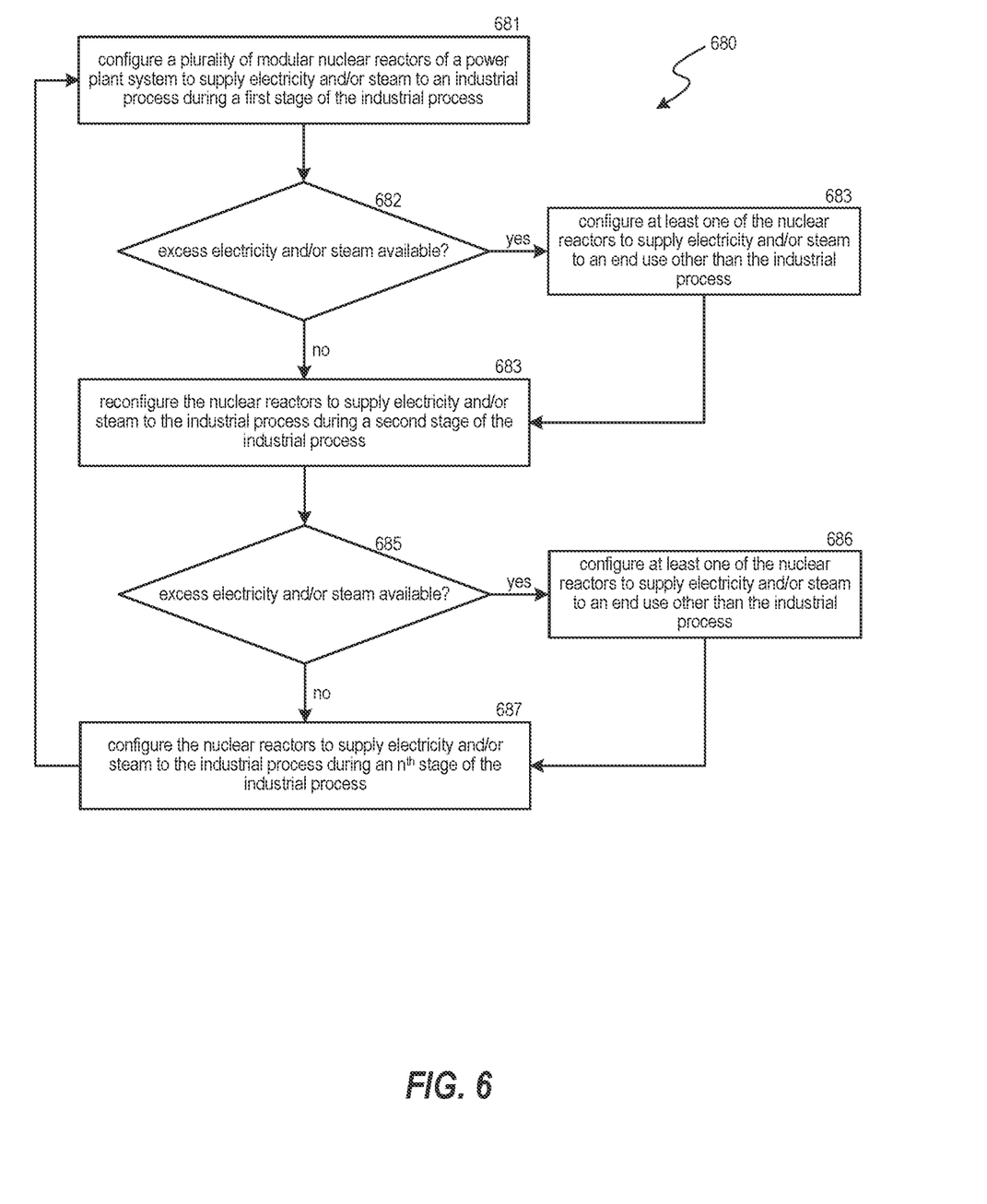
FIG. 6 is a flow diagram of a process or method for operating an Integrated Energy System including the power plant system of FIG. 3 for an industrial process requiring both steam and electricity in accordance with embodiments of the present technology.

Although many of the embodiments described herein are in the context of an enhanced oil recovery operation, such as a SAGD operation, the power plant system 350 can be beneficially used in an integrated energy system for any process that requires both steam and electricity, and particularly beneficially, in processes that require differing amounts of steam and electricity throughout various stages of the process. FIG. 6 for example, is a flow diagram of a process or method 680 for operating an integrated energy system including the power plant system 350 for an industrial process requiring both steam and electricity in accordance with embodiments of the present technology. Although some features of the method 680 are described in the context of the power plant system 350 shown in FIG. 3 for the sake of illustration, one skilled in the art will readily understand that the method 680 can be carried out using other suitable systems described herein.

At block 681, the method 680 can include configuring the nuclear reactors 300 of the power plant system 350 in a first operating state to supply electricity and/or steam to the industrial process (e.g., a primary subsystem for carrying out the industrial process) during a first stage of the industrial process. For example, in the first operating state, a first subset of the nuclear reactors 300 can be configured to output steam to the steam transmission system 356 for use in the industrial process and a second subset of the nuclear reactors 300 can be configured to output steam to the electrical power conversion systems 340 to provide electricity to the electrical power transmission system 354 for use in the industrial process. In some embodiments, the first stage of the industrial process requires only electricity, only steam, both electricity and steam, or neither electricity nor steam during the first stage.

At decision block 682, the method 680 can include determining whether excess electricity and/or steam are available from the power plant system 350 during the first stage of the industrial process. That is the method can 680 can determine whether the electricity and/or steam required by the industrial process can be met with less than all of the nuclear reactors 300. If there is excess electricity and/or steam available, the method 680 can proceed to block 683 to configure at least one of the nuclear reactors 300 to supply electricity and/or steam to one or more end uses other than the industrial process (e.g., a secondary subsystem for carrying out a secondary process), such as the other industrial processes 464 and/or the power grid 466 shown in FIG. 4. For example, if neither electricity nor steam are required by the industrial process during the first stage, all of the nuclear reactors 300 can be configured to supply electricity and/or steam to the other end uses. If there is not excess electricity and/or steam available, the method 680 can proceed to block 683.

At block 684, the method 680 can include reconfiguring the nuclear reactors 300 of the power plant system 350 in a second operating state to supply electricity and/or steam to the industrial process during a second stage of the industrial process. The second stage can be different from the first stage and can have different electricity and/or steam requirements. Accordingly, in some embodiments at least one of the nuclear reactors 300 can be switched in the second operating state from the first operating state between steam generation for transport to the steam transmission system 356 and steam generation for use in generating electricity via the corresponding ones of the electrical power conversion systems 340. In some embodiments, the second stage of the industrial process requires only electricity, only steam, both electricity and steam, or neither electricity nor steam during the second stage.

At decision block 685, the method 680 can include determining whether excess electricity and/or steam are available from the power plant system 350 during the second stage of the industrial process. That is the method can 680 can determine whether the electricity and/or steam required by the industrial process can be met with less than all of the nuclear reactors 300. If there is excess electricity and/or steam available, the method 680 can proceed to block 686 to configure at least one of the nuclear reactors 300 to supply electricity and/or steam to one or more the end uses other than the industrial process. If there is not excess electricity and/or steam available, the method 680 can proceed to block 687.

At block 687, the method 680 can include reconfiguring the nuclear reactors 300 of the power plant system 350 in an $n^{th}$ operating state to supply electricity and/or steam to the industrial process during an $n^{th}$ stage of the industrial process. Block 687 can be generally similar or identical to blocks 681 and 683 described in detail above and the configuration of the nuclear reactors 300 for electricity and/or steam can be based on the energy demands of the $n^{th}$ stage. Any excess electricity and/or steam available during the $n^{th}$ stage can be routed to the end uses other than the industrial process in a similar manner to blocks 683 and 686. The industrial process can have any number n of stages with differing electricity and/or steam requirements, and the power plant system 350 can have corresponding operating states that meet the electricity and/or steam requirements of the different stages. If the industrial process is cyclical, such that the first through $n^{th}$ stages are repeated one or more times, the method 680 can return to block 681 after block 687.

III. Additional Examples

The following examples are illustrative of several embodiments of the present technology:

1. An integrated energy system, comprising:
    a power plant system operably coupled to a primary subsystem for carrying out an industrial process and a secondary subsystem for carrying out a secondary process, wherein the industrial process includes multiple stages having different electricity and steam requirements, wherein the power plant system includes a plurality of nuclear reactors and an electrical power conversion system, wherein individual ones of the nuclear reactors are configured to heat a coolant into steam, and wherein—
        during a first stage of the multiple stages of the industrial process, the power plant system is configured to have a first operating state in which (a) the steam from a first subset of the nuclear reactors is routed to the primary subsystem and (b) the steam from a second subset of the nuclear reactors is routed to the electrical power conversion system to generate electricity that is routed to the primary subsystem; and
        during a second stage of the multiple stages of the industrial process, the power plant system is configured to have a second operating state different from the first operating state in which the steam from at least one of the nuclear reactors in the first subset or the second subset is routed (a) to the secondary subsystem or (b) to the electrical power conversion system to generate electricity that is routed to the secondary subsystem.
2. The integrated energy system of example 1 wherein the industrial process is an enhanced oil recovery operation.

3. The integrated energy system of example 1 or example 2 wherein the power plant system is local to the primary subsystem.
4. The integrated energy system of anyone of examples 1-3 wherein, in the first operating state, the steam from a third subset of the nuclear reactors is routed (a) to the secondary subsystem or (b) to the electrical power conversion system to generate electricity that is routed to the secondary subsystem.
5. The integrated energy system of anyone of examples 1-4 wherein the secondary subsystem is a hydrogen production plant.
6. The integrated energy system of anyone of examples 1-5 wherein the secondary subsystem is a power grid.
7. An integrated energy system for enhanced oil recovery, comprising:
    a steam injection well extending into an oil reservoir;
    an industrial processing plant; and
    a power plant system operably coupled to the steam injection well and the industrial processing plant, wherein the power plant system includes a plurality of nuclear reactors and an electrical power conversion system, wherein individual ones of the nuclear reactors are configured to heat a coolant into steam, and wherein—
        during a first stage of an enhanced oil recovery operation, the power plant system is configured to have a first operating state in which the steam from a subset of the nuclear reactors is routed to the steam injection well for injection into the oil reservoir; and
        during a second stage of the enhanced oil recovery operation, the power plant system is configured to have a second operating state different from the first operating state in which the steam from at least one of the nuclear reactors in the subset is routed (a) to the industrial processing plant or (b) to the electrical power conversion system to generate electricity that is routed to the industrial processing plant.
8. The integrated energy system of example 7 wherein the industrial processing plant is a hydrogen production plant.
9. The integrated energy system of example 7 or example 8, further comprising an auxiliary heater operably coupled to the power plant system, wherein the steam from the subset of the nuclear reactors is routed to the auxiliary heater in the first operating state, and wherein the auxiliary heater is configured to route the steam to the steam injection well for injection into the oil reservoir.
10. The integrated energy system of any one of examples 7-9 wherein, in the second operating state (a) the steam from the at least one of the nuclear reactors in the subset is routed to the industrial processing plant and (b) the steam from at least another one of the nuclear reactors in the subset is routed to the electrical power conversion system to generate electricity that is routed to the industrial processing plant.
11. The integrated energy system of claim 10 wherein the industrial processing plant is a hydrogen production plant.
12. The integrated energy system of any one of examples 7-11, further comprising:
    an oil recovery well extending into the oil reservoir;
    an oil recovery plant operably coupled to the oil recovery well; and
    wherein during a third stage of the enhanced oil recovery operation, the power plant system is configured to have a third operating state different from the first and second operating states in which the steam from at least one of the nuclear reactors in the subset is routed to the electrical power conversion system to generate electricity that is routed to the oil recovery plant.
13. The integrated energy system of any one of examples 7-12, further comprising a water production plant operably coupled to the power plant system, wherein, in the first operating state, the steam from a another subset of the nuclear reactors is routed to the electrical power conversion system to generate electricity that is routed to the water production plant.
14. The integrated energy system of claim 13 wherein the coolant is water, and wherein the water production plant is configured to supply the nuclear reactors with the water.
15. The integrated energy system of claim 13 or example 14 wherein the water production plant is a desalination plant.
16. The integrated energy system of claim 13 or example 14 wherein the water production plant is a water treatment plant.
17. The integrated energy system any one of examples 7-16 wherein the enhanced oil recovery operation is a steam-assisted-gravity-drain (SAGD) operation.
18. The integrated energy system of any one of examples 7-17 wherein the power plant system is local to the oil reservoir.
19. A method of operating an integrated energy system for enhanced oil recovery including a power plant system having a plurality of nuclear reactors and an electrical power conversion system, wherein individual ones of the nuclear reactors are configured to heat a coolant into steam, the method comprising:
    during a first stage of an enhanced oil recovery operation, configuring the power plant system to have a first operating state in which the steam from a subset of the nuclear reactors is routed to a steam injection well for injection into an oil reservoir; and
    during a second stage of the enhanced oil recovery operation, configuring the power plant system to have a second operating state different from the first operating state in which the steam from at least one of the nuclear reactors in the subset is routed (a) to an industrial processing plant or (b) to the electrical power conversion system to generate electricity that is routed to the industrial processing plant.
20. The method of example 19 wherein configuring the power plant system to have the second operating state further comprises routing (a) the steam from the at least one of the nuclear reactors in the subset to the industrial processing plant and (b) the steam from at least another one of the nuclear reactors in the subset to the electrical power conversion system to generate electricity that is routed to the industrial processing plant, and wherein the method further comprises:
    during a third stage of the enhanced oil recovery operation, configuring the power plant system to have a third operating state different from the first and second operating states in which the steam from at least one of the nuclear reactors in the subset is routed to the electrical power conversion system to generate electricity that is routed to an oil recovery plant operably coupled to an oil recovery well that extends into the oil reservoir.

IV. Conclusion

All numeric values are herein assumed to be modified by the term about whether or not explicitly indicated. The term about, in the context of numeric values, generally refers to a range of numbers that one of skill in the art would consider equivalent to the recited value (e.g., having the same function and/or result). For example, the term about can refer to the stated value plus or minus ten percent. For example, the use of the term about 100 can refer to a range of from 90 to 110, inclusive. In instances in which the context requires otherwise and/or relative terminology is used in reference to something that does not include, or is not related to, a numerical value, the terms are given their ordinary meaning to one skilled in the art.

The above detailed description of embodiments of the present technology are not intended to be exhaustive or to limit the technology to the precise forms disclosed above. Although specific embodiments of, and examples for, the technology are described above for illustrative purposes, various equivalent modifications are possible within the scope of the technology, as those skilled in the relevant art will recognize. For example, although steps may be presented in a given order, in other embodiments, the steps may be performed in a different order. The various embodiments described herein may also be combined to provide further embodiments.

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms may also include the plural or singular term, respectively.

As used herein, the phrase and/or as in A and/or B refers to A alone, B alone, and A and B. Additionally, the term comprising is used throughout to mean including at least the recited feature(s) such that any greater number of the same feature and/or additional types of other features are not precluded. It will also be appreciated that specific embodiments have been described herein for purposes of illustration, but that various modifications may be made without deviating from the technology. Further, while advantages associated with some embodiments of the technology have been described in the context of those embodiments, other embodiments may also exhibit such advantages, and not all embodiments need necessarily exhibit such advantages to fall within the scope of the technology. Accordingly, the disclosure and associated technology can encompass other embodiments not expressly shown or described herein.

We claim:

1. An integrated energy system for enhanced oil recovery, comprising:
    a steam injection well extending into an oil reservoir;
    an industrial processing plant; and
    a power plant system operably coupled to the steam injection well and the industrial processing plant, wherein the power plant system includes a plurality of small modular reactors and an electrical power conversion system, wherein individual ones of the small modular reactors are configured to heat a coolant into steam, and wherein during a first stage of an enhanced oil recovery operation, the power plant system is configured to have a first operating state in which the steam generated by a subset of the small modular reactors is directly routed to an auxiliary heater that superheats the steam and provides superheated steam to the steam injection well for injection into the oil reservoir; and
    during a second stage of the enhanced oil recovery operation, the power plant system is configured to have a second operating state different from the first operating state in which the steam from at least one of the small modular reactors in the subset is routed (a) to the industrial processing plant or (b) to the electrical power conversion system to generate electricity that is routed to the industrial processing plant.

2. The integrated energy system of claim 1 wherein the industrial processing plant is a hydrogen production plant.

3. The integrated energy system of claim 1 wherein, in the second operating state (a) the steam from the at least one of the small modular reactors in the subset is routed to the industrial processing plant and (b) the steam from at least another one of the small modular reactors in the subset is routed to the electrical power conversion system to generate electricity that is routed to the industrial processing plant.

4. The integrated energy system of claim 3 wherein the industrial processing plant is a hydrogen production plant.

5. The integrated energy system of claim 1, further comprising:
    an oil recovery well extending into the oil reservoir;
    an oil recovery plant operably coupled to the oil recovery well; and
    wherein during a third stage of the enhanced oil recovery operation, the power plant system is configured to have a third operating state different from the first and second operating states in which the steam from at least one of the small modular reactors in the subset is routed to the electrical power conversion system to generate electricity that is routed to the oil recovery plant.

6. The integrated energy system of claim 1, further comprising a water production plant operably coupled to the power plant system, wherein, in the first operating state, the steam from another subset of the small modular reactors is routed to the electrical power conversion system to generate electricity that is routed to the water production plant.

7. The integrated energy system of claim 6 wherein the coolant is water, and wherein the water production plant is configured to supply the small modular reactors with the water.

8. The integrated energy system of claim 6 wherein the water production plant is a desalination plant.

9. The integrated energy system of claim 6 wherein the water production plant is a water treatment plant.

10. The integrated energy system of claim 1 wherein the enhanced oil recovery operation is a steam-assisted-gravity-drain (SAGD) operation.

11. The integrated energy system of claim 1 wherein the power plant system is local to the oil reservoir.

12. The integrated energy system of claim 1 wherein the superheated steam has a temperature greater than 600° C.

13. A method of operating an integrated energy system for enhanced oil recovery including a power plant system having a plurality of small modular reactors and an electrical power conversion system, wherein individual ones of the small modular reactors are configured to heat a coolant into steam, the method comprising:
    during a first stage of an enhanced oil recovery operation, configuring the power plant system to have a first operating state in which the steam from a subset of the small modular reactors is directly routed to an auxiliary heater that superheats the steam to be provided to a steam injection well for injection into an oil reservoir; and during a second stage of the enhanced oil recovery operation, configuring the power plant system to have a second operating state different from the first operating state in which the steam from at least one of the small modular reactors in the subset is routed (a) to an industrial processing plant or (b) to the electrical power conversion system to generate electricity that is routed to the industrial processing plant.

14. The method of claim 13 wherein configuring the power plant system to have the second operating state further comprises routing (a) the steam from the at least one of the small modular reactors in the subset to the industrial processing plant and (b) the steam from at least another one of the small modular reactors in the subset to the electrical power conversion system to generate electricity that is routed to the industrial processing plant, and wherein the method further comprises:

during a third stage of the enhanced oil recovery operation, configuring the power plant system to have a third operating state different from the first and second operating states in which the steam from at least one of the small modular reactors in the subset is routed to the electrical power conversion system to generate electricity that is routed to an oil recovery plant operably coupled to an oil recovery well that extends into the oil reservoir.

15. The method of claim 14 wherein the first stage, second stage, and third stage of the oil recovery process are repeated until a flow of oil falls below a target threshold.

* * * * *